United States Patent [19]

Van Berkel

[11] Patent Number: 5,802,331
[45] Date of Patent: Sep. 1, 1998

[54] DATA PROCESSING SYSTEM COMPRISING AN ASYNCHRONOUSLY CONTROLLED PIPELINE

[75] Inventor: Cornelis H. Van Berkel, Eindhoven, Netherlands

[73] Assignee: U.S. Philips Corporation, New York, N.Y.

[21] Appl. No.: 702,305

[22] Filed: Aug. 23, 1996

[30] Foreign Application Priority Data

Aug. 23, 1995 [EP] European Pat. Off. ............. 95202279

[51] Int. Cl.[6] .................. G06F 13/42; G06F 13/14
[52] U.S. Cl. .................. 395/309; 395/306; 395/395; 364/DIG. 1; 364/DIG. 2
[58] Field of Search .................. 395/82.08, 369, 395/674, 733, 859, 381, 291, 182.22, 732, 185.05, 309, 306, 285, 301, 288, 395; 364/DIG. 1, DIG. 2; 370/438, 296; 371/49.1; 340/825.05

[56] References Cited

U.S. PATENT DOCUMENTS 5,155,726  10/1992  Spinney et al. ............. 340/825.05
5,155,854  10/1992  Flynn et al. ............. 395/674
5,313,386   5/1994  Cook et al. ............. 395/182.38

OTHER PUBLICATIONS

Publication by I.E. Sutherland in Communications of the ACM, vol. 32, No. 6, pp. 720–738.

*Primary Examiner—Daniel H. Pan*

[57] ABSTRACT

A data processing system transports data via successive stages of a pipeline. Whenever possible the stages are in a transparent mode so that data made available can travel through the pipeline with a minimum delay. The arrival of data is signaled by a preceding stage by making the potential on a conductive connection to the stage high. In response thereto the stage switches over to a hold mode which enables new data to be made available on its input even before the data has been passed on. The stage makes the potential on the conductive connection to the next stage high and the potential on the conductive connection to the preceding stage low again, and also sets a register. The register is reset and the stage becomes transparent again as soon as it receives an acknowledge signal from its successor, signifying that the data has been taken up. For as long as the register is in the set state, the stage does not respond to the fact that the potential on the connection to the preceding stage becomes high, except that the stage itself starts to keep the potential on the connection high.

20 Claims, 7 Drawing Sheets

DATA PROCESSING SYSTEM COMPRISING AN ASYNCHRONOUSLY CONTROLLED PIPELINE

BACKGROUND OF THE INVENTION

1. Field of the Invention

The invention relates to a data processing system which comprises a pipeline of successive stages, each of which can be switched between a data hold mode and a data transparent mode, which stages coupled in cascade by couplings for the transmission of data and handshakes through the pipeline, in which each handshake comprises a request signal and an acknowledge signal, in which each successive stage returns, if or as soon as it is in the data transparent mode, an acknowledge signal after reception of a request signal and passes on the request signal through the pipeline, and in which each stage is switched to the data hold mode upon passing on of the request signal and is switched to the data transparent mode upon reception of the returned acknowledge signal.

2. Description of Related Art

A system of this kind is known from a publication by I. E. Sutherland in "Communications of the ACM, volume 32, number 6, pages 720 to 738". The data transport through the pipeline is asynchronous, the request signal indicating the availability of data whereas an acknowledge signal indicates that the data has been taken up (in the hold mode).

Whenever possible, the stages are in the transparent mode, so that data made available can travel through the pipeline with a minimum delay. Behind the traveling data the stages are switched to the hold mode so as to enable new data to be made available even before the data has traversed the entire pipeline. Each stage then becomes transparent again upon reception of the acknowledge signal from its successor, signifying that the data has been taken over.

The known circuit comprises a request input and an acknowledge output for each stage in the pipeline. The request signal is generated by inducing a level transition in the potential on the request input, and the stage generates the acknowledge signal by inducing a level transition in the potential on the acknowledge output. Transitions from logic high to logic low as well as transitions from logic low to logic high can be used as the acknowledge signal or the request signal.

The use of the two types of transition necessitates the use of a rather complex circuit which lowers the maximum speed at which request signals can be processed. However, if only one type of potential level transition is used as the request signal or the acknowledge signal, the potential must be restored to its original level before a new request signal or acknowledge signal is possible. This would slow down the circuit.

SUMMARY OF THE INVENTION

Therefore, it is inter alia an object of the invention to provide a system of the kind set forth which is faster and, moreover, less complex.

The data processing system in accordance with the invention is characterized in that the synchronization circuits are arranged to exchange the request signal and the acknowledge signal on at least one of the couplings as mutually opposed transitions in a level of a potential on one and the same conductor. Due to the generating opposite potential transitions on one and the same conductor, the potential after the acknowledge signal returns to its level prevailing before the request signal, without potential transitions other than that for the request signal and that for the acknowledge signal being required. It has been found that the operation of the pipeline is then faster.

An embodiment of the data processing circuit in accordance with the invention is characterized in that the synchronization circuit comprises a register, set and reset means for setting a logic bit in the register upon returning of the acknowledge signal, and for resetting the relevant logic bit upon reception of a further acknowledge signal from the pipeline, in response to the passing on of the request signal, resetting having priority over setting, the synchronization circuit comprising disable means for disabling the passing on of the request signal as well as the returning of the acknowledge signal for as long as the logic bit has been set. The register ensures that no new request signals are processed before the passed on request signal has been acknowledged via the pipeline.

A further embodiment of a data processing circuit in accordance with the invention is characterized in that the synchronization circuit comprises a passive connection for receiving the request signal and for returning the acknowledge signal, an active connection for passing on the request signal and for receiving an acknowledge signal in response thereto, and a first and a second supply connection, the acknowledge signal switching the potential to a first supply potential on the first supply connection whereas the request signal switches the potential to a second supply potential on the second supply connection, the synchronization circuit comprising means for establishing a conductive connection between the first supply connection and the passive connection for as long as the potential on the active connection has been pulled to the second supply potential and the logic bit has been reset. As a result, the circuit is very fast.

In a further embodiment of the data processing circuit in accordance with the invention, a plurality of pipelines is connected to the conductor in parallel. A number of pipelines can thus be controlled in parallel.

These and other aspects of the invention will be apparent from and elucidated with reference to the embodiments described hereinafter.

DESCRIPTION OF THE PREFERRED EMBODIMENTS

Figure 1:
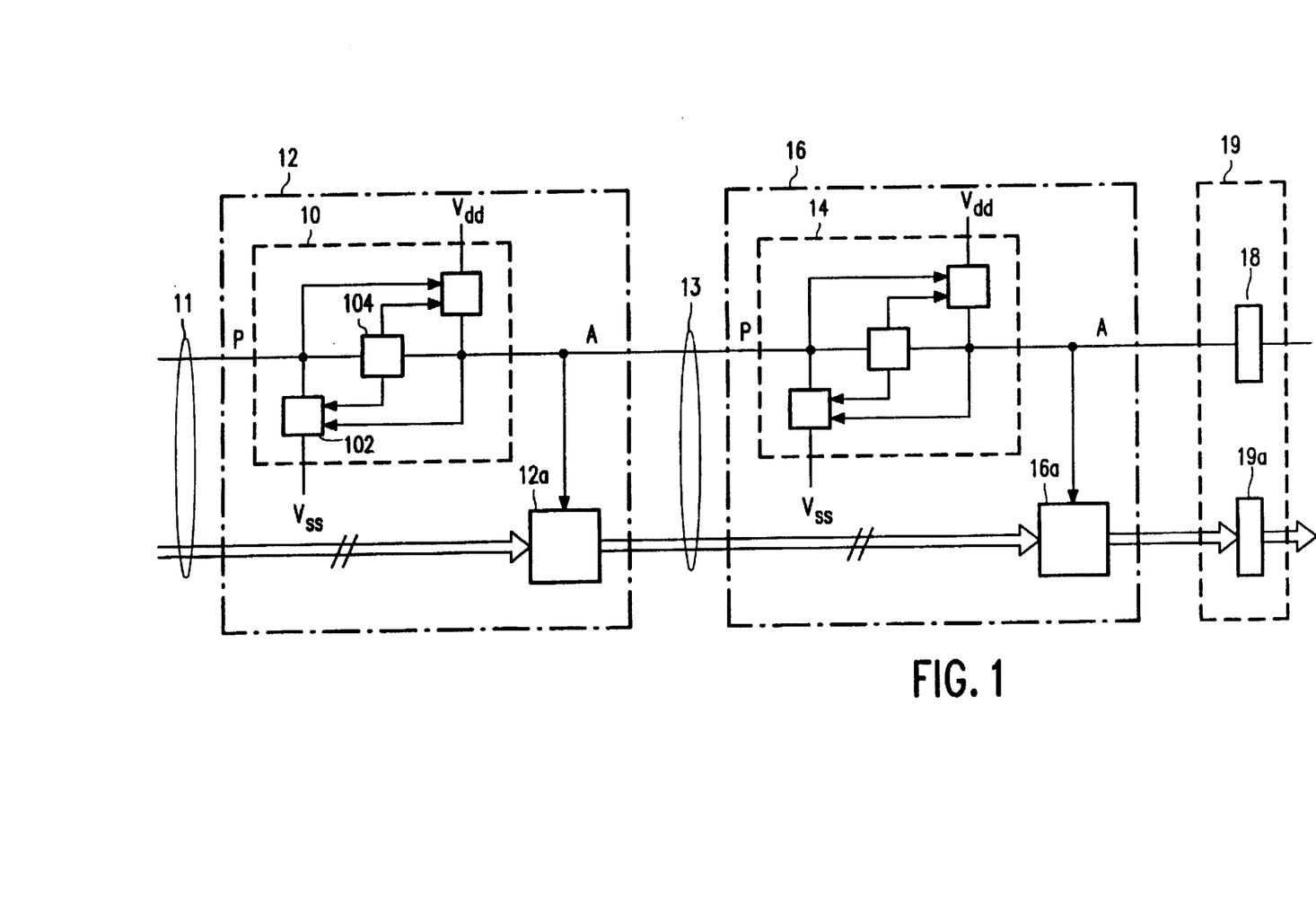
FIG. 1 shows a pipeline for a data processing system in accordance with the invention.

FIG. 1 shows a pipeline for a data processing system in accordance with the invention. The pipeline comprises an input coupling 11 which is coupled to a first stage 12. The pipeline shown also comprises two subsequent stages 16, 19, each of which is coupled to a preceding stage via a respective coupling 13, 17. If desired, combinatory logic circuits (not shown) may be connected between the stages. The stages will usually be integrated together on a semiconductor substrate.

The first stage 12 comprises a latch 12a and a synchronization circuit 10. The input coupling 11 comprises a data connection which is coupled to an input of the latch 12a and a handshake connection which is coupled to a passive handshake connection P of the synchronization circuit 10. The coupling 13 to the next stage 16 in the pipeline comprises a data connection which is coupled to an output of the latch 12a, and a handshake connection which is coupled to an active handshake connection A of the synchronization circuit 10. (As will be apparent from the following description, the designations "passive" and "active" refer notably to the fact that the active connection generates request signals, whereas a passive connection P acknowledges request signals. This is intended to distinguish the various handshake connections of the synchronization circuit 10. Consequently, the designations "active" and "passive" do not have the meaning used for conventional circuits.) The active handshake connection A of the synchronization circuit 10 is also coupled to a control input of the latch 12a.

The synchronization circuit 10 comprises a pull-down circuit 102 which is coupled between the passive handshake connection P of the synchronization circuit 10 and a first supply connection Vss. The synchronization circuit 10 also comprises a pull-up circuit 106 which is coupled between the active handshake connection A of the synchronization circuit 10 and a second supply connection Vdd. The passive handshake connection P and the active handshake connection A of the synchronization circuit 10 are also coupled to a set input and a reset input, respectively, of a register 104. The pull-up circuit 106 has control inputs coupled to the passive handshake connection P of the synchronization circuit 10 and an output of the register 104. The pull-down circuit 102 has control inputs coupled to the active handshake connection A of the synchronization circuit 10 and an output of the register 104.

The second and the third stage 16, 19 of the pipeline have the same structure as the first stage 12, i.e. they comprise a synchronization circuit 14, 18 and a latch 16a, 19a. The synchronization circuits also have the same structure. This is shown only for the synchronization circuit 14.

During operation data is presented to the input of the latch 12a via the data connection. A signal on the control input of the latch 12a switches the latch to and fro between a "hold" mode and a "transparent" mode. In the transparent mode the latch 12a outputs the same data as received on its input. When the latch 12a is switched to the "hold" mode, it freezes the last value of data it outputs on the output at that instant. In the "hold" mode the latch 12a continues to output this last value of the data on the output.

If the data on the input coupling 11 is valid, validity is signaled, via the input coupling 11, by means of an external request signal. In response to this request signal the synchronization circuit 10 generates and returns an acknowledge signal via the input coupling 11 and applies a further request signal on the coupling 13 to the second stage 16. This further request signal also switches the latch 12a to the hold mode. After reception of a further acknowledge signal from the second stage 16, via the coupling 13, the latch 12a is switched to the transparent mode again. For as long as the further acknowledge signal has not yet been received from the second stage 16, new request signals on the input coupling 11 will not be acknowledged and no further request signals for the second stage will be generated.

If desired, combinatory logic circuits (not shown) may be inserted between the stages 12, 16, 19. The data connections then extend via said combinatory logic circuits. In that case delay circuits (not shown) are inserted between the synchronization circuits, said delay circuits having a delay which corresponds to the delay of the corresponding combinatory logic circuits.

The combinatory logic circuits thus process data items successively presented to the input coupling 11. The pipeline of FIG. 1 ensures that the results of the processing of various data items can be distinguished at the end of the pipeline on the basis of request signals on the output of the pipeline. Reception on the output is acknowledged by an acknowledge signal.

If no data items are being processed in the pipeline, the data items can traverse the entire pipeline without stalling. As more data items are being processed, data items will incur more delay because latches are retained in the hold mode and request signals are not immediately acknowledged. The entire procedure is realized in an asynchronous manner, i.e. without central clock for driving the latches.

Each request signal is formed by a respective transition in the potential level on the conductor connected to the handshake input. This potential transition switches said potential level from the level of the first supply connection Vss to that of the second supply connection Vdd. Each acknowledge signal constitutes a reverse potential transition on the conductor on which the associated, preceding request signal has been received. After a handshake (request signal and associated acknowledge signal), the potential level on the conductor has thus returned to the level prevailing prior to the handshake.

The operation of the synchronization circuit 10 is dependent on the potential level range in which the potentials on the passive handshake connection P and the active handshake connection A are situated. Two potential level ranges can be distinguished: the Vss range and the Vdd range. The Vss range comprises the potential level of the first supply connection Vss and an adjoining part of the range between the potential levels of the first and the second supply connection Vss, Vdd. The Vdd range comprises the potential level of the second supply connection Vdd and an adjoining part of the range between the potential levels of the first and the second supply connection Vss, Vdd. There may be a separation between the Vdd range and the Vss range.

The pull-down circuit 102 pulls the potential level on the passive handshake connection P of the synchronization circuit 10 to the potential level of the first supply connection Vss if the potential level on the active handshake connection A of the synchronization circuit 10 is in the Vdd range and the register 104 is in the reset state. The pull-down circuit 102 thus generates an acknowledge signal after a request signal has been generated on the active handshake connection A of the synchronization circuit 10, provided that the register has been reset.

The pull-up circuit 106 pulls the potential level on the active handshake connection A of the synchronization circuit 10 to the potential level of the second supply connection Vdd if the potential level on the passive handshake connection P of the synchronization circuit 10 is in the Vdd range and the register 104 has been reset. The pull-up circuit 106 thus generates a request signal after a request signal has been generated on the passive handshake connection P of the synchronization circuit 10, provided that the register has been reset.

The register 104 stores a bit which indicates, if it has been reset, that the synchronization circuit 10 is ready to process a request signal on the passive connection P11. The register 104 is reset if the potential level on the active handshake connection A of the synchronization circuit 10 is in the Vss range, i.e. if the request signal on the active connection has been acknowledged. The register 104 is set if the potential level on the passive handshake connection P of the synchronization circuit 10 is in the Vss range. In the case of simultaneous set and reset, reset has priority. The register 104 prevents that upon reception of a request signal on the passive handshake connection P of the synchronization circuit 10 this signal is acknowledged or that a request signal is generated on the active handshake connection A before the preceding request signal on the active handshake connection A has been acknowledged.

Figure 2:
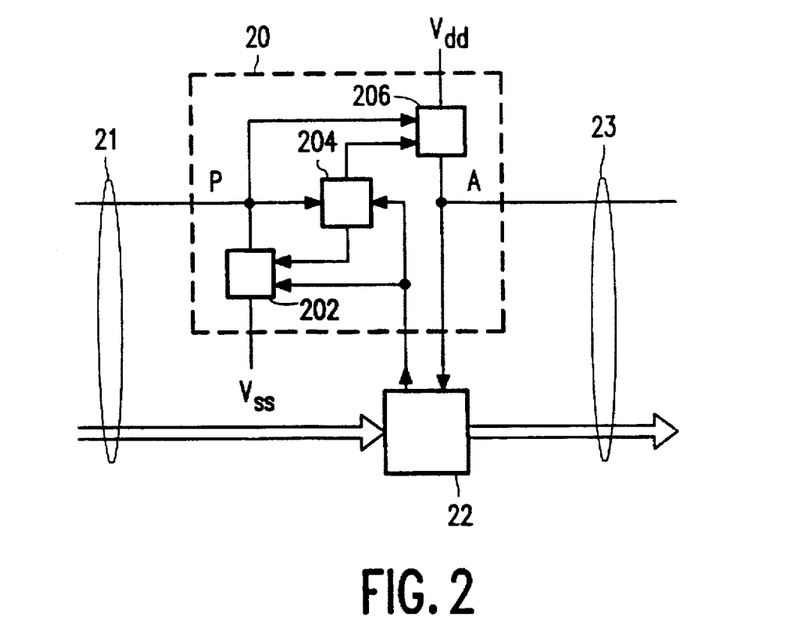
FIG. 2 shows a stage for a pipeline.

FIG. 2 shows a stage for a pipeline, comprising an input coupling 21, a synchronization circuit 20, a latch 22 and an output coupling 23. The stage of FIG. 2 resembles the first stage of FIG. 1 in a number of respects. For example, the synchronization circuit 20 also comprises a pull-down circuit 202, a register 204 and a pull-up circuit 206 which have the same functions as the corresponding circuits of FIG. 1. The major difference resides in the fact that use is made of a latch comprising an acknowledge output. As opposed to FIG. 1, instead of the active handshake connection A of the synchronization circuit 20, the acknowledge output of the latch 22 is coupled to the reset input of the register 204 and the pull-down circuit 202.

During operation the latch 22 generates a potential level transition on the acknowledge output each time when a mode transition from hold to transparent or vice versa has been completed. If the potential is in the Vdd range, the transition to the hold mode has been completed and if the potential is in the Vss range, the transition to the transparent mode has been completed.

The circuit of FIG. 2 thus ensures that request signals on the passive handshake connection P of the synchronization circuit 20 are not acknowledged before the mode transition of the latch 22 to the hold mode has been completed. This is advantageous notably if use is made of a large latch 22 capable of holding a large number of bits simultaneously in parallel. In that case the time required to switch over the mode is comparatively long. In the absence of the circuit of FIG. 2 problems would then be encountered.

Figure 3:
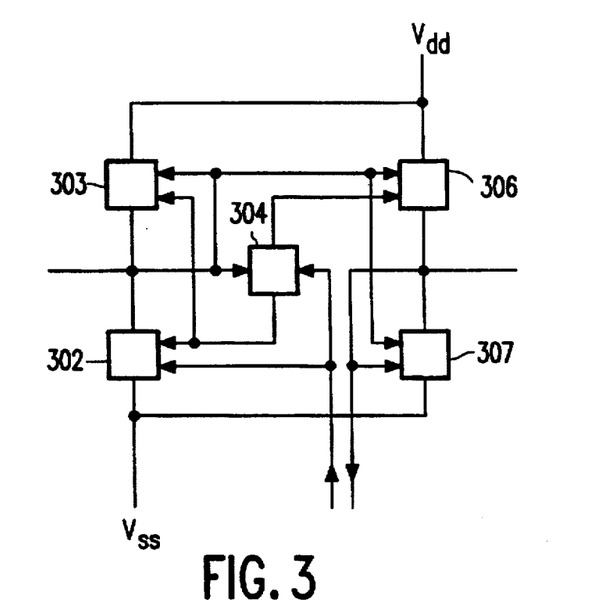
FIG. 3 shows a synchronization circuit.

FIG. 3 shows a synchronization circuit which comprises the same components as the synchronization circuit 20 of FIG. 2, plus a supplementary pull-up circuit 303 and a supplementary pull-down circuit 307. The supplementary pull-up circuit 303 is coupled between the passive handshake connection P of the synchronization circuit and the second supply connection Vdd. The control inputs of the supplementary pull-up circuit 303 are coupled to the passive handshake connection P of the synchronization circuit and to the register 304, respectively, together with the control input of the pull-down circuit 302. The supplementary pull-down circuit 307 is coupled between the active handshake connection A of the synchronization circuit and the first supply connection Vss. The control inputs of the supplementary pull-down circuit 307 are coupled to the active handshake connection A of the synchronization circuit and to the register 304, respectively, together with the control input of the pull-up circuit 306.

During operation the supplementary pull-up circuit 303 is conductive if the register 304 is in the set state and the potential on the passive connection P is in the Vdd range or a slightly wider range (e.g. 0.1 V closer to Vss). The supplementary pull-up circuit serves to keep the level of the potential on the passive handshake connection P of the synchronization circuit at the level of the potential Vdd on the second supply connection after a request signal. The supplementary pull-up circuit 303 thus ensures that a disturbance pulse on the conductor connected to the passive handshake connection P of the synchronization circuit does not cause a "false" potential level transition which could be mistaken for an acknowledge signal. The supplementary pull-up circuit 303 also ensures that the logic state of the circuit cannot be disturbed by leakage currents. These risks exist notably if the request signal remains unacknowledged for a prolonged period of time as is the case when the register 304 has been set.

During operation the supplementary pull-down circuit 307 is conductive if the potentials on the passive and active connections are both in the Vss range or a slightly wider range for the active connection (e.g. 0.1 V closer to Vdd). The supplementary pull-down circuit 307 serves to keep the level of the potential on the active handshake connection A of the synchronization circuit at the level of the potential on the first supply connection Vss. The supplementary pull-down circuit 307 thus ensures that a disturbance pulse on the conductor connected to the active handshake connection A of the synchronization circuit does not cause a "false" potential level transition which could be mistaken for a request signal. The supplementary pull-down circuit 307 also ensures that the logic state of the circuit cannot be disturbed by leakage currents. These risks exist notably if no request signal is to be expected on the active connection A for a prolonged period of time, as is the case if no request signal has yet been received on the passive connection P.

A supplementary pull-up circuit and a supplementary pull-down circuit, having the same functions, can be included analogously in the synchronization circuit 10 of FIG. 1.

Figure 4:
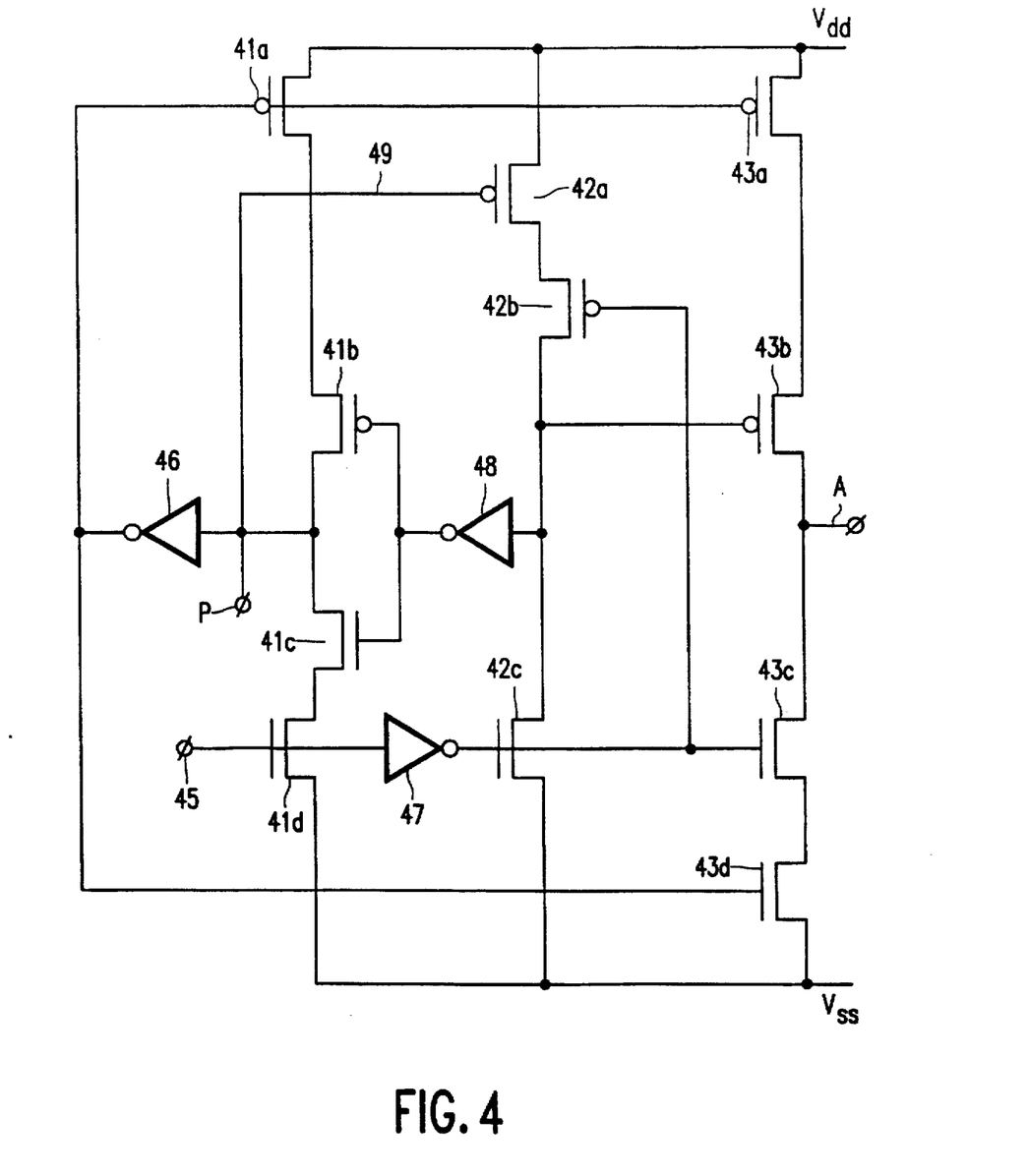
FIG. 4 shows an embodiment of a circuit for implementing the synchronization circuit of FIG. 3.

FIG. 4 shows an example of a circuit for implementing the synchronization circuit of FIG. 3. The circuit comprises three branches 41a-d, 42a-c and 43a-d for controlling the passive connection P, for implementing the register, and for controlling the active connection A, respectively.

The first branch 41a-d comprises successively, connected between the supply connections Vdd and Vss, a first series connection of the channels of a first and a second PMOS transistor 41a,b and a second series connection of the channels of a first and a second NMOS transistor 41c,d. The passive connection P is connected to a junction of the first and the second series connection.

The second branch 42a-c comprises successively, connected between the supply connections Vdd and Vss, a third series connection of the channels of a first and a second PMOS transistor 42a,b and the channel of an NMOS transistor.

The third branch 43a-d comprises successively, connected between the supply connections Vdd and Vss, a fourth series connection of the channels of a first and a second PMOS transistor 43a,b and a fifth series connection of the channels of a first and a second NMOS transistor 43c,d.

The passive connection P is connected to a junction of the first and the second series connection. The passive connection P is also connected to the gate of the first PMOS transistor 42a of the third series connection. Moreover, the active connection A 40 is connected, via an inverter 46, to the gates of the first PMOS transistors 41a, 43a of the first and the fourth series connection and to the gate of the second NMOS transistor 43d in the fifth series connection.

The junction in the second branch 42a-c between the third series connection 42a-b and the channel of the NMOS transistor 42c is connected to the gate of the second PMOS transistor 43b in the fourth series connection 43a-b and, via an inverter, to the gates of the second PMOS transistor 41b and the first NMOS transistor 41c in the first branch 41a-d.

The active connection A is connected to a junction of the fourth and the fifth series connection. The circuit also comprises an input 45. The input 45 is connected to the active output 44 when the embodiment shown in FIG. 1 is adopted. If the embodiment shown in FIG. 2 is adopted, the active connection A is connected to the latch 22 and the response signal of the latch is applied to the input 45.

During operation the circuit shown in FIG. 4 receives and acknowledges request signals on the passive connection P, transmits request signals on the active connection A, and receives acknowledgement of the transmitted request signals. The second branch 42a-c acts as a dynamic register which stores a bit indicating whether the circuit is ready to process a next request signal on the passive connection P. The circuit is considered to be ready if the potential on the junction in the second branch is low (at Vss); the register is then in the reset state.

The request signal consists of a transition of the potential from Vss to Vdd on the passive connection P.

The fourth series connection in the third branch serves to generate a similar transition on the active connection A in response thereto, provided that the register 42a-c indicates that the circuit is ready in that the potential on the junction between the third series connection 42a,b and the NMOS transistor 42c in the second branch 42a-c is low.

The second series connection 41c-d serves to acknowledge the request signal on the passive connection P by generating a transition from Vdd to Vss on this output as soon as the potential on the input 45 (equal to the potential on the active output 44 in one embodiment) is high, be it that the register 42a-c should again indicate that the circuit is ready to process the request signal.

The third series connection 42a,b serves to set the register 42a,c if the potential on the passive connection P has been come low again, for the purpose of acknowledgement, and for as long as the potential on the input 45 has not become low again for the purpose of acknowledgement. The potential on the junction of the second branch 42a-c thus becomes high.

The NMOS transistor 42c in the second branch serves to reset the register 42a,c as soon as the potential on the input 45 becomes low, signifying that the request signal on the active connection A has been processed. The potential on the junction in the second branch 42a-c then become low again.

The first series connection 41a,b serves to keep the potential on the passive connection P high, after it has been made high by a request signal, for as long as the register 42a,c indicates that the circuit is not yet ready to process the request signal. This enhances the ruggedness of the circuit, but is not necessary for the logic function.

The fifth series connection 43c,d serves to keep the potential on the active connection A low, after it has been made low by an acknowledge signal, for as long as no new request signal has been received on the passive connection P. This enhances the ruggedness of the circuit, but is not necessary for the logic function.

The first series connection 41a,b and the fifth series connection 43c,d thus serve as the supplementary pull-up circuit 303 and the supplementary pull-up circuit 307, respectively. For the ruggedness of the circuit it is attractive if, upon reception of a request signal, the supplementary pull-up circuit 303 becomes conductive before the pull-up circuit generating the request signal becomes non-conductive. Furthermore, for the ruggedness of the circuit it is also advantageous if, upon reception of an acknowledge signal, the supplementary pull-up circuit 307 becomes conductive before the pull-down circuit generating the acknowledge signal becomes non-conductive. It is thus ensured that the potential cannot remain floating halfway a potential transition, because during the transition either the pull-down circuit is conductive briefly together with the supplementary pull-down circuit or the pull-up circuit is conductive briefly together with the supplementary pull-up circuit.

To this end, the threshold potential of the inverter 46 controlling the turning on of the PMOS transistor 41a in the first series connection 41a,b is chosen to be lower than the threshold potential of the inverter 47 which controls the turning off of the fourth series connection 43a,b after the generating of the request signal on the active connection A. The difference between the threshold voltages amounts to, for example 0.1 V or more. Assuming that the request signal on the passive connection P is generated by a circuit of the kind shown in FIG. 4, the intended result is that upon reception of a request signal the supplementary pull-up circuit 303 becomes conductive before the pull-up circuit generating the attention signal becomes non-conductive.

This choice of the threshold potential of the inverters 46, 47 has the consequence, also for other potential transitions, that the supplementary pull-up circuit 303 and the supplementary pull-down circuit 307 briefly control the potential on the connections in cooperation with the corresponding pull-up circuit and pull-down circuit, respectively.

In FIG. 4 this does not hold for all potential transitions in all circumstances. Notably the first series connection will never become conductive if the register 42a-d has not been set, not even if the potential on the passive connection 40 becomes high. Moreover, the fifth series connection 43c,d will never become conductive if the potential on the passive connection P is high, not even if the potential on the active connection line becomes low.

Figure 4A:
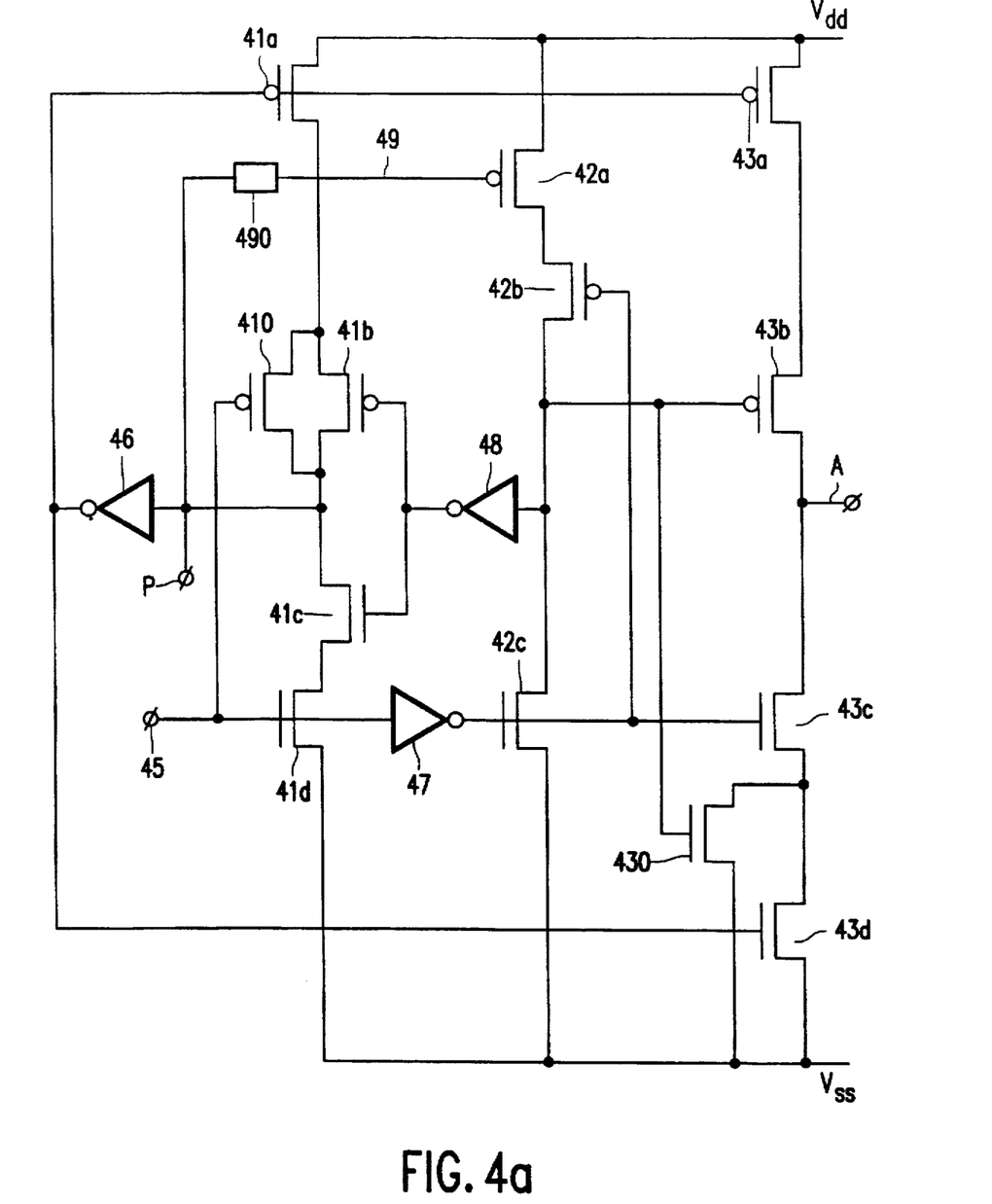
FIG. 4a shows a version of the circuit shown in FIG. 4.

FIG. 4a shows a version of the circuit of FIG. 4 in which as number of steps have been taken to ensure that the control of the connections 40, 44 is taken over also in these circumstances. The first step involves a further PMOS transistor 410 in the first series connection 41a,b. the further PMOS transistor 410 is arranged so that its drain and source are connected to the drain and the source, respectively, of the second PMOS transistor 41b. The gate of the further PMOS transistor 410 is connected to the input 45. As a result, the first series connection will also be conductive if the register 42a-c has not been set but the potential on the input 45 is low. Consequently, pulling up takes place if the passive connection P 44 is at the potential after the request signal and the logic "OR" of the state of the register and the inverse of the signal on the input 45 is "TRUE". As a result, the potential on the passive connection P will always be pulled up immediately after a request signal, regardless of whether or not the circuit is ready to process this signal.

The second step involves a further NMOS transistor 430 in the fifth series connection 43c,d (preferably, but not necessarily, in combination with the further PMOS transistor). The drain and the source of the further NMOS transistor 430 are connected to the drain and the source, respectively, of the second NMOS transistor 43d. The gate of said further NMOS transistor is connected to the junction of the third series connection 42a,b and the NMOS transistor 42c in the second branch 42a-c. Pulling down, therefore, takes place if the active connection A carries the potential after the acknowledge signal and the logic "OR" of the state of the register and the inverse of the signal on the passive connection P is "TRUE". Thus, the fifth series connection 43c,d will always pull down the potential on the active connection A immediately after an acknowledge signal, regardless of whether or not a request signal is present on the passive connection P.

Furthermore, in the connection 49 between the passive connection P and the first PMOS transistor 42a in the second branch there is inserted a threshold circuit 490 which turns on the PMOS transistor 42a in the second branch 42a-c only after the potential on the passive connection P has dropped below a threshold potential. When this PMOS transistor is turned on, the register will be set (assuming that the potential on the input 45 is high). Via the inverter 48 the second series connection 41c,d is thus switched off. This completes the generating of the acknowledge signal.

The acknowledge signal is received by a further synchronization circuit which forms part of a preceding stage in the pipeline and generally has the same structure as that shown in FIG. 3. The threshold potential of the threshold circuit 490 is preferably chosen to be lower than the potential at which the pull-down circuit 43c,d in the further synchronization circuit is activated. As a result, the synchronization circuit will allow the potential on the passive connection P to float only after the further synchronization circuit already started to pull this potential to the potential of Vdd.

The threshold circuit 490 is implemented, for example by means of a series connection of two inverters, the already present inverter 46 preferably being used as the first inverter. The presence of the threshold circuit 490 makes the synchronization circuit slightly slower, because the signals first have to traverse the threshold circuit.

Evidently, the desired function of the synchronization circuit can also be realized by means of other logic circuits. For example, the register 42a-c may be replaced by a static flip-flop. It is only essential that the synchronization circuit generates an opposed potential transition on the passive connection P in response to a potential level transition on the passive connection P and a potential transition on the active connection A, both provided that the register indicates that the synchronization circuit is ready for this purpose. After the generating of these signals, the synchronization circuit will not be ready to generate these signals until an opposed transition occurs in the potential on the active connection A. This is maintained by the register.

The embodiments of the invention shown in the FIGS. 3 and 4, however, offer a very fast implementation of this function.

Figure 5:
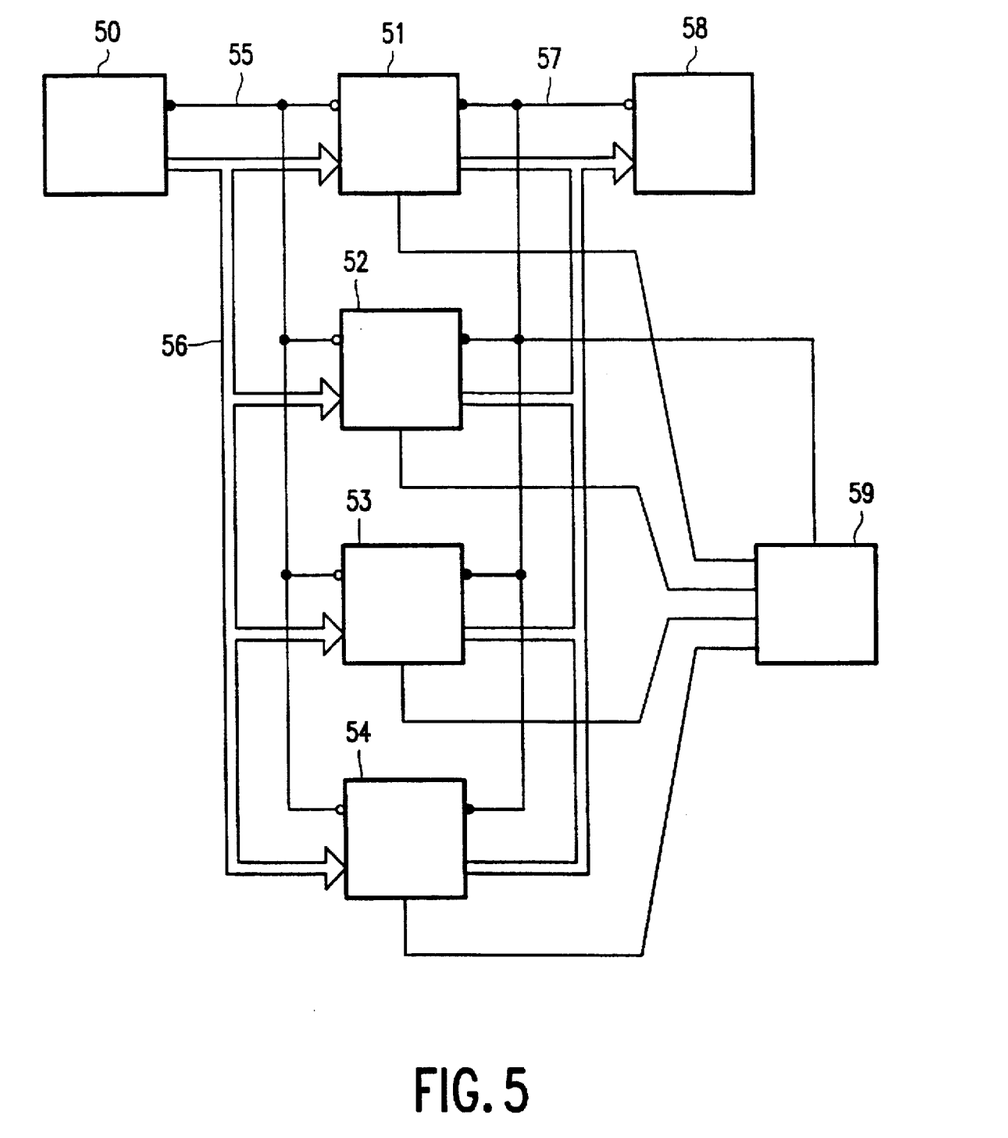
FIG. 5 shows a circuit in accordance with the invention in which a source is coupled in parallel to a plurality of pipelines 51, 52, 53, 54, via a connection 55, 56.

FIG. 5 shows a circuit in accordance with the invention in which a source is coupled in parallel to a plurality of pipelines 51, 52, 53, 54, via a connection 55, 56. At their output the pipelines 51, 52, 53, 54 are connected in parallel to a common receiver 58 and an arbiter 59.

During operation the source 50 each time transmits a request signal and a data/address to the pipelines 51, 52, 53, 54. The request signal is a potential transition on the conductor 55. Each pipeline 51, 52, 53, 54 receives the address and detects whether this address selects the relevant pipeline. The selected pipeline 51, 52, 53, 54 receives the data and subsequently acknowledges the request signal by returning the potential on the conductor 55 to the potential level prevailing directly before the request signal. Different pipelines can thus receive data in dependence on the address.

The construction utilizing the connection 55, 56 whereby a number of pipelines 51, 52, 53 54 are coupled in parallel to a common source 50, however, is not restricted to pipelines: other circuits may also (or exclusively) be connected in parallel to a connection 55, 56 and, when selected, receive the data and acknowledge the request signal.

Figure 6:
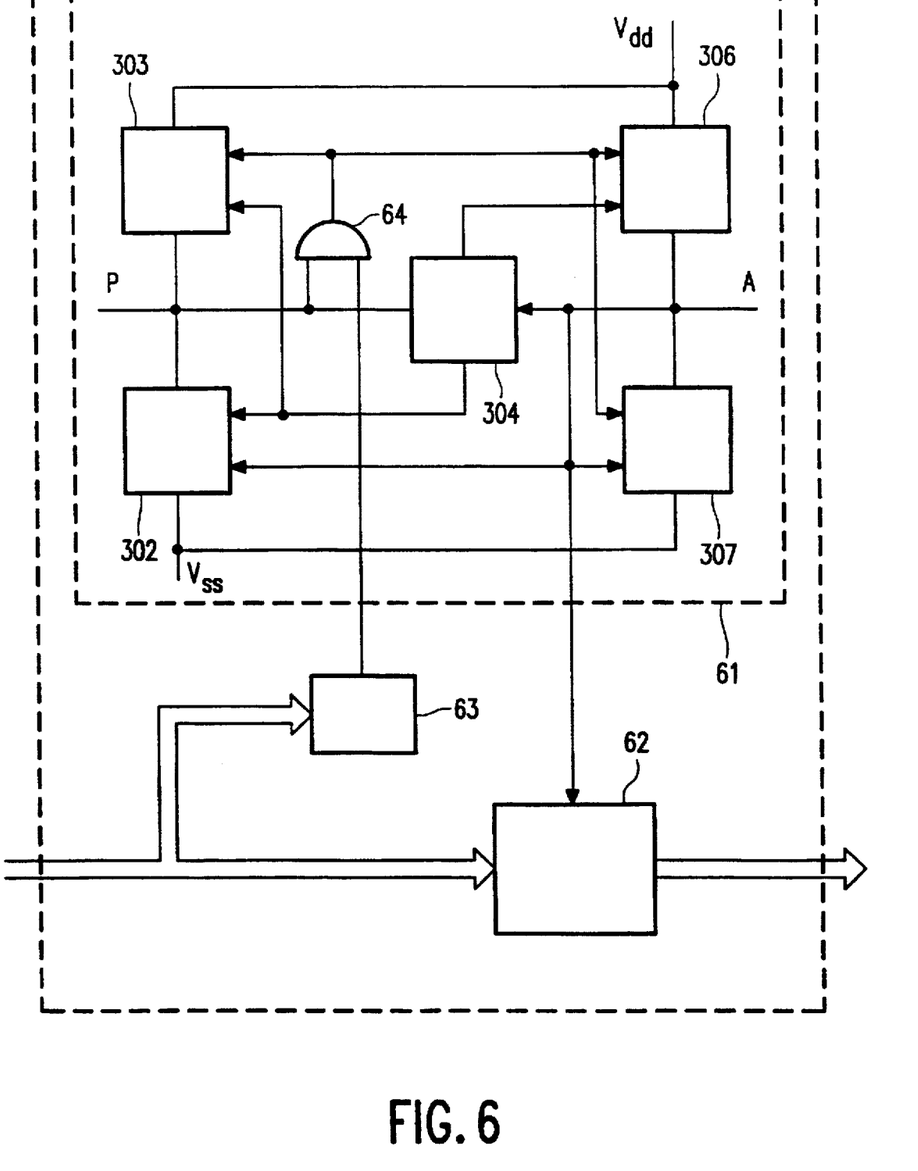
FIG. 6 shows a first stage 60 of a pipeline for use in the circuit shown in FIG. 5.

FIG. 6 shows a first stage 60 of a pipeline for use in the circuit shown in FIG. 5. The first stage 60 comprises a synchronization circuit 61, a latch 62 and a decoder 63. The latch 62 and the address decoder 63 receive the data/address. The address decoder 63 comprises an output for an enable signal which is coupled to a first input of an AND gate 64 in the synchronization circuit 61. The connections between the latch 62 and the synchronization circuit for the remainder correspond to the connections shown in FIG. 1. However, this is not essential: the construction of FIG. 2 could also be used in this case.

Generally speaking, the synchronization circuit 61 is similar to that shown in FIG. 3. The difference with respect to FIG. 3 consists in that the passive connection P is coupled to a second input of the AND-gate 64. The output of the AND gate is coupled to the pull-down circuit 303 of the passive connection P, the pull-up circuit 306 of the active connection A, and the pull-down circuit 307 of the active connection A. The passive connection P is coupled to the set input of the register 304 while by-passing the AND gate 64.

Addresses and request signals are generated on the connection 56, 55 during operation. The request signal is generated after the address has become available and the address is not modified until after the request signal has been acknowledged. The decoder 63 decodes the address and detects whether the address selects the relevant stage. If this is the case, the decoder 63 applies an enable signal to the synchronization circuit 61.

Instead of selection by means of an address as described above, selection can also be realized in a different way, for example by selecting each time a next pipeline 51, 52, 53, 54 for successive request signals and by cyclically repeating this operation. Use can also be made of a central selection unit which decodes the address and applies enable signals to the various pipelines.

In the presence of the enable signal the synchronization circuit 61 operates exactly as described with reference to FIG. 3.

In the absence of the enable signal the synchronization circuit 61 does not accept incoming request signals: in response to a request signal on the passive connection P, in that case no request signal is generated on the active connection A and no acknowledge signal is generated on the passive connection P and the potential of the passive connection P is not kept high.

In the absence of the enable signal, however, the synchronization circuit 61 does process the acknowledge signals arriving on the active connection A: the register 64 is then reset and the potential on the active connection A is kept low after the acknowledge signal. After the generating of a request signal on the active connection A, the register 64 will also be set.

The logic function of the AND gate 64, evidently, can also be realized in other ways, for example in FIG. 4 by adding a respective transistor to the transistors 41a, 43a, 43d which are controlled by the passive connection P, the gate of said additional transistors being controlled by the enable signal. For example, each time the channel of an additional PMOS transistor could be connected in series with the channel of the PMOS transistor 41a in the first branch 41a-d, in series with the channel of the PMOS transistor 43a in the third branch, and in parallel with the channel of the NMOS transistor 43d in the third branch 43a-d an additional NMOS transistor could be connected. The gates of the additional transistors are controlled by the inverse of the enable signal.

When circuits other than the pipelines 51, 52, 53, 54 are connected in parallel to the connection 55, 56, evidently these circuits should also be arranged so that the acceptance of the request signals on the connection is blocked if the relevant circuit has not been selected. On the other hand, the internal operation need not be inhibited in the absence of selection: even when they have not been selected, these circuits may continue to process data and address having arrived in the selected state of the circuit.

FIG. 5 also shows a common receiver 58. During operation an arbiter 59 selects each time one of the pipelines for the transmission of data to the receiver 58. The selected pipeline generates a request signal and data for the receiver 58. The non-selected pipelines then operate the data lines in the tri-state mode. The request signal is a potential transition on the conductor 57 which interconnects the pipelines and the receiver 58. The receiver 58 receives the data and subsequently acknowledges the request signal by returning the potential on the conductor 57 to the potential level prevailing immediately before the request signal. For example, different pipelines can thus alternately transmit data to the receiver.

The construction utilizing the connection which couples a number of pipelines 51, 52, 53, 54 in parallel to a common receiver 58, however, is not limited to pipelines: other circuits can also (and possibly exclusively) be connected parallel to a connection and transmit the data and generate a request signal upon selection.

For example, the arbiter can alternately select the various pipelines. When the pipelines are also alternately selected at the side of the source 50, a data rate reducing circuit is obtained, the data rate in the pipelines being a fraction of the data rate on the connection 56. Other mechanisms, for example, a contention mechanism between the various pipelines, can also be used for the arbitration. In these cases the pipelines can decide the arbitration among themselves without an external arbiter being required.

Figure 7:
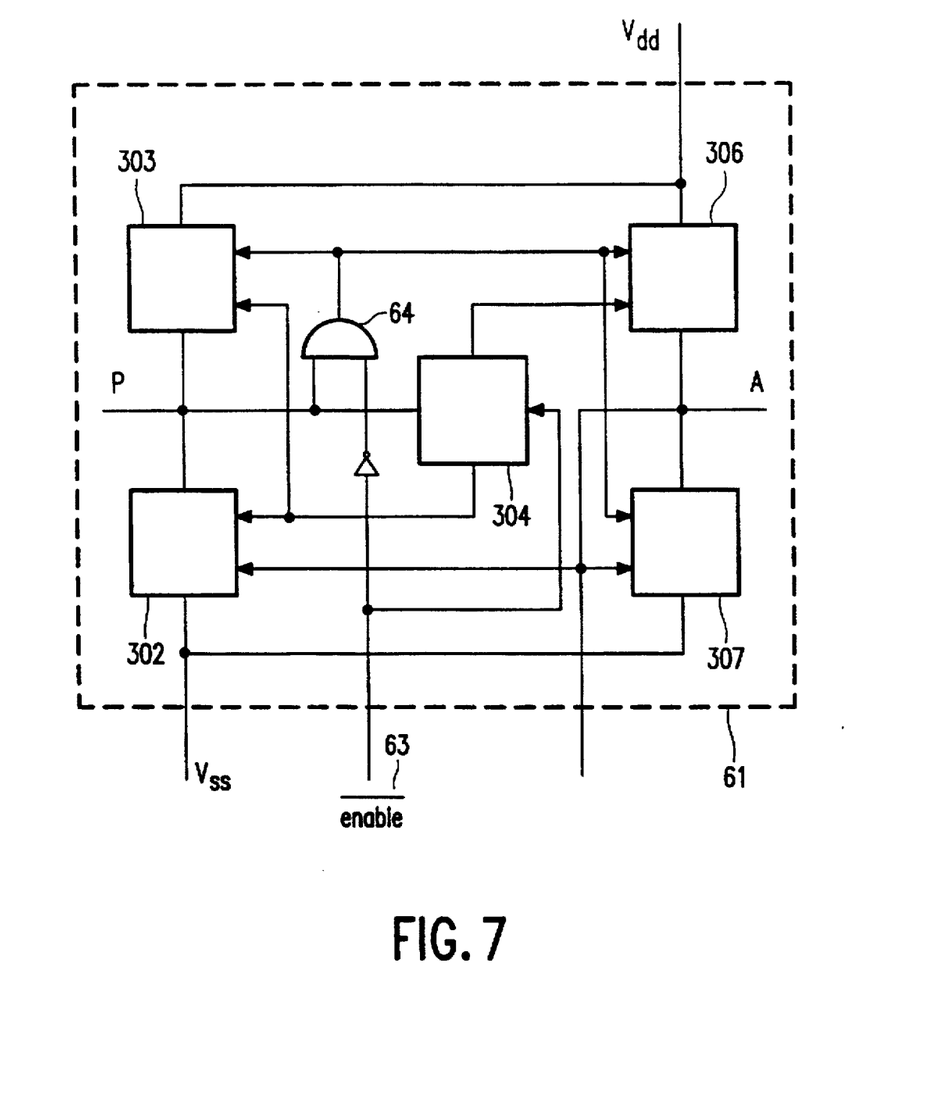
FIG. 7 shows a synchronization circuit for a last stage of a pipeline for use in the circuit shown in FIG. 5.

FIG. 7 shows a synchronization circuit for a last stage of a pipeline for use in the circuit shown in FIG. 5.

Generally speaking, the synchronization circuit is the same as that shown in FIG. 6. The difference with respect to FIG. 6 consists in that instead of the active connection A the enable input is coupled to the reset input of the register. The enable input is furthermore coupled, via an inverter, to the first input of the AND-gate 64.

During operation the synchronization circuit receives an inverse enable signal from the arbiter on the enable input. The inverse enable signal is generated at an instant at which the potential on the active output is low (after an acknowledge signal) and is removed only after this potential has become low again, subsequent to a request signal and an associated acknowledge signal.

The operation of the synchronization circuit is practically the same as described with reference to FIG. 6. A request signal can be generated on the active connection A, in response to a request signal on the passive connection P, only if the arbiter selects the synchronization circuit. When this request signal on the active connection A has been acknowledged, however, the register 304 is not reset immediately. As a result, a new request signal on the passive connection P cannot be dealt with. The register 304 is reset only after the arbiter has removed the enable signal again. Subsequently, further request signals from the passive connection P cannot be accepted either. Thus, per enable pulse only one handshake is performed on the active connection A.

I claim:

1. A data processing system which comprises a pipeline of successive stages, each of which capable of being switched between a data hold mode and a data transparent mode, which stages are coupled in cascade by couplings for the transmission of data and handshakes through the pipeline, in which each handshake comprises a request signal and an acknowledge signal, in which each successive stage returns, if or as soon as it is in the data transparent mode, an acknowledge signal after reception of a request signal and passes on the request signal through the pipeline, and in which each stage is switched to the data hold mode upon passing on of the request signal and is switched to the data transparent mode upon reception of the returned acknowledge signal, such that synchronization circuits are arranged to exchange the request signal and the acknowledge signal on at least one of the couplings as mutually opposed transitions in a level of a potential on one and the same conductor.

2. A data processing system as claimed in claim 1, wherein each stage comprises a latch via which the transport of the data takes place, the conductor on which said stage passes on the request signal being coupled to a hold/transparent control input of the latch.

3. A data processing system as claimed in claim 2, wherein a synchronization circuit comprises a register, set and reset means for setting a logic bit in the register upon returning of the acknowledge signal, and for resetting the logic bit upon reception of a further acknowledge signal from the pipeline, in response to the passing on of the request signal, resetting having priority over setting, the synchronization circuit comprising disable means for disabling the passing on of the request signal as well as the returning of the acknowledge signal for as long as the logic bit has been set.

4. A data processing system as claimed in claim 2, in which the latch comprises an acknowledge output for acknowledging a mode switch by the latch, the stage being arranged to acknowledge the request signal only after reception of the acknowledgement of the mode switch.

5. A data processing system as claimed in claim 4, wherein a synchronization circuit comprises a register, set and reset means for setting a logic bit in the register upon returning of the acknowledge signal, and for resetting the relevant logic bit upon reception of a further acknowledge signal from the pipeline, in response to the passing on of the request signal, resetting having priority over setting, the synchronization circuit comprising disable means for disabling the passing on of the request signal as well as the returning of the acknowledge signal for as long as the logic bit has been set.

6. A data processing system as claimed in claim 1, wherein a synchronization circuit comprises a register, set and reset means for setting a logic bit in the register upon returning of the acknowledge signal, and for resetting the relevant logic bit upon reception of a further acknowledge signal from the pipeline, in response to the passing on of the request signal, resetting having priority over setting, the synchronization circuit comprising disable means for disabling the passing on of the request signal as well as the returning of the acknowledge signal for as long as the logic bit has been set.

7. A data processing system as claimed in claim 6, wherein a synchronization circuit comprises a passive connection for receiving the request signal and for returning the acknowledge signal, an active connection for passing on the request signal and for receiving an acknowledge signal in response thereto, and a first and a second supply connection, the acknowledge signal switching the potential to a first supply potential on the first supply connection whereas the request signal switches the potential to a second supply potential on the second supply connection, the synchronization circuit comprising means for establishing a conductive connection between the first supply connection and the passive connection for as long as the potential on the active connection has been pulled to the second supply potential and the logic bit has been reset.

8. A data processing system as claimed in claim 7, wherein said data processing system further comprises request hold means for establishing a first further conductive connection between the passive connection and the second supply connection if the potential on the passive connection has been pulled to the second supply potential and the logic bit is in the set state.

9. A data processing system as claimed in claim 8, wherein said data processing system comprises acknowledge hold means for establishing a second further conductive connection between the active connection and the first supply connection if the potential on the active connection has been pulled to the first supply potential and the potential on the passive connection has been pulled to the first supply potential.

10. A data processing system as claimed in claim 8, wherein request hold means are arranged to establish the first further conductive connection as soon as the potential on the passive connection exceeds a threshold potential, that the set means and reset means are arranged to stop the resetting of the register if the potential on the active connection exceeds a further threshold, and that the threshold is situated nearer to the first supply potential than the further threshold.

11. A data processing system as claimed in claim 10, wherein the request hold means are arranged to establish the first further conductive connection also if the potential on the active connection has been pulled to the second supply potential and the potential on the passive connection has been pulled to the second supply potential.

12. A data processing system as claimed in claim 10, wherein said data processing system comprises acknowledge hold means for establishing a second further conductive connection between the active connection and the first supply connection if the potential on the active connection has been pulled to the first supply potential and the potential on the passive connection has been pulled to the first supply potential.

13. A data processing system as claimed in claim 11, wherein said data processing system comprises acknowledge hold means for establishing a second further conductive connection between the active connection and the first supply connection if the potential on the active connection has been pulled to the first supply potential and the potential on the passive connection has been pulled to the first supply potential.

14. A data processing system as claimed in claim 7, wherein said data processing system further comprises acknowledge hold means for establishing a second further conductive connection between the active connection and the first supply connection if the potential on the active connection has been pulled to the first supply potential and the potential on the passive connection has been pulled to the first supply potential.

15. A data processing system as claimed in claim 14, wherein the acknowledge hold means are arranged to establish the second further conductive connection as soon as the potential on the active connection exceeds a threshold potential, that the set means and reset means are arranged to set the register if the potential on the passive connection exceeds a further threshold, and that the threshold is situated nearer to the second supply potential than the further threshold.

16. A data processing system as claimed in claim 15, wherein the acknowledge hold means are arranged to establish the second further conductive connection between the active connection and the first supply connection also if the potential on the active connection has been pulled to the first supply potential and the logic bit is in the set state.

17. A data processing system as claimed in claim 1 wherein plurality of pipelines are connected to the conductor in parallel.

18. A data processing method in a data processing system having a pipeline of successive stages, each of which capable of being switched between a data hold mode and a data transparent mode, which stages are coupled in cascade by couplings for the transmission of data and handshakes through the pipeline, in which each handshake comprises a request signal and an acknowledge signal, the method comprising the steps of:

returning an acknowledge signal after reception of a request signal if or as soon as it is in the data transparent mode;

passing on the request signal through the pipeline;

switching each stage to the data hold mode upon passing on of the request signal;

switching to the data transparent mode upon reception of the returned acknowledge signal; and exchanging the request signal and the acknowledge signal on at least one of the couplings as mutually opposed transitions in a level of a potential on a same conductor.

19. The data processing method as claimed in claim 18, further including the steps of:

setting a logic bit in a register upon returning of the acknowledge signal;

resetting the logic bit upon reception of a further acknowledge signal from the pipeline, in response to the passing on of the request signal; and disabling the passing on of the request signal as well as the returning of the acknowledge signal if the logic bit is set.

20. The data processing method as claimed in claim 18, further comprising the step of:

actively pulling on said same conductor to separate potential levels when said same conductor is transitioning between said mutually opposed transitions.

* * * * *